(12) United States Patent
Baker et al.

(10) Patent No.: US 9,628,847 B2
(45) Date of Patent: *Apr. 18, 2017

(54) RENDERABLE CONTENT PARTITIONING AND PORTABILITY

(71) Applicant: International Business Machines Corporation, Armonk, NY (US)

(72) Inventors: Nathan A. Baker, Raleigh, NC (US); James D. Creasman, Apex, NC (US); Barry J. Pellas, Raleigh, NC (US); Adrian P. Vrouwenvelder, Chapel Hill, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/954,099

(22) Filed: Nov. 30, 2015

(65) Prior Publication Data

US 2016/0088343 A1    Mar. 24, 2016

Related U.S. Application Data

(63) Continuation of application No. 12/551,905, filed on Sep. 1, 2009, now Pat. No. 9,232,263.

(51) Int. Cl.
*H04N 5/92*     (2006.01)
*H04N 21/433*   (2011.01)
(Continued)

(52) U.S. Cl.
CPC ..... *H04N 21/4334* (2013.01); *H04N 21/4147* (2013.01); *H04N 21/41407* (2013.01);
(Continued)

(58) Field of Classification Search
CPC ........... H04N 21/4334; H04N 21/4333; H04N 21/4335; H04N 21/41407; H04N 21/84
(Continued)

(56) References Cited

U.S. PATENT DOCUMENTS 6,429,879 B1   8/2002   Sturgeon et al.
8,699,848 B2   4/2014   Tsukuda
(Continued)

OTHER PUBLICATIONS

Loi H. Tran, Examiner, United States Patent and Trademark Office, Office Action for U.S. Appl. No. 12/551,905, Oct. 26, 2011, pp. 1-14, Alexandria, VA, USA.
(Continued)

*Primary Examiner* — William Tran
(74) *Attorney, Agent, or Firm* — Lee Law, PLLC; Christopher B. Lee

(57) ABSTRACT

A mobile device controls content partitioning at a separate renderable content storage device of an item of renderable content into multiple partitioned content segments that are each less in size than the entire item of renderable content and that each fit within available memory of the mobile device. The mobile device renders on a display device of the mobile device multiple received content partition identifiers that each identify one partitioned content segment. The mobile device retrieves from the separate renderable content storage device a partitioned content segment of the item of renderable content identified by a user-selected content partition identifier. The mobile device renders the partitioned content segment. The mobile device automatically retrieves, in response to completion of rendering of the partitioned content segment, a second partitioned content segment using a second content partition identifier of the received multiple content partition identifiers.

20 Claims, 5 Drawing Sheets

(51) Int. Cl.
  *H04N 21/414* (2011.01)
  *H04N 21/4335* (2011.01)
  *H04N 21/4147* (2011.01)
  *H04N 21/84* (2011.01)
(52) U.S. Cl.
  CPC ..... *H04N 21/4333* (2013.01); *H04N 21/4335* (2013.01); *H04N 21/84* (2013.01)
(58) Field of Classification Search
  USPC .......................................................... 386/247
  See application file for complete search history.

(56) References Cited

U.S. PATENT DOCUMENTS

| | | | |
|---|---|---|---|
| 8,700,798 | B2 | 4/2014 | Van Horck et al. |
| 2003/0177503 | A1 | 9/2003 | Sull et al. |
| 2003/0198458 | A1 | 10/2003 | Greenwood |
| 2005/0275566 | A1 | 12/2005 | Lahtiranta et al. |
| 2006/0271977 | A1 | 11/2006 | Lerman et al. |
| 2006/0277272 | A1 | 12/2006 | Cantalini |
| 2007/0098357 | A1 | 5/2007 | McEnroe et al. |
| 2009/0079823 | A1* | 3/2009 | Bellamy .......... G08B 13/19656 348/143 |
| 2009/0150558 | A1* | 6/2009 | Lee ......................... H04L 47/30 709/231 |
| 2009/0232220 | A1 | 9/2009 | Neff et al. |
| 2010/0154021 | A1* | 6/2010 | Howarter ........... H04N 21/4126 725/141 |

OTHER PUBLICATIONS

Loi H. Tran, Examiner, United States Patent and Trademark Office, Office Action for U.S. Appl. No. 12/551,905, Mar. 30, 2012, pp. 1-13, Alexandria, VA, USA.

Loi H. Tran, Examiner, United States Patent and Trademark Office, Examiners Answer for U.S. Appl. No. 12/551,905, Oct. 9, 2012, pp. 1-16, Alexandria, VA, USA.

Jason V. Morgan, et al., Patent Trial and Appeal Board, United States Patent and Trademark Office, Decision on Appeal for U.S. Appl. No. 12/551,905, Jun. 2, 2015, pp. 1-16, Alexandria, VA, USA.

Loi H. Tran, Examiner, United States Patent and Trademark Office, Notice of Allowance for U.S. Appl. No. 12/551,905, Aug. 28, 2015, pp. 1-24, Alexandria, VA, USA.

* cited by examiner

RENDERABLE CONTENT PARTITIONING AND PORTABILITY

BACKGROUND

The present invention relates to audio and video content playback. More particularly, the present invention relates to renderable content partitioning and portability.

Movies and other renderable content include audio and video components. The audio and video components are stored in content storage devices, such as server devices, computer hard drives, and portable media including digital video discs (DVDs). Renderable content may be downloaded from a server device and rendered on a television or other display device associated with a computing device. Downloaded renderable content may be stored on a storage device associated with a server, a digital video recorder (DVR), a computer hard drive, a DVD, or on other storage media. Additionally, renderable content stored on a DVD, a storage device associated with a DVR, a computer hard drive, or on other storage media may be rendered on the television or other display device associated with the computing device.

SUMMARY

A method includes controlling, via a mobile device, content partitioning at a separate renderable content storage device of an item of renderable content into a plurality of partitioned content segments that are each less in size than the entire item of renderable content and that each fit within available memory of the mobile device; rendering, on a display device of the mobile device as received from the separate renderable content storage device, a plurality of content partition identifiers that each identify one partitioned content segment of the plurality of partitioned content segments of the item of renderable content; retrieving, from the separate renderable content storage device, a first partitioned content segment of the plurality of partitioned content segments of the item of renderable content identified by a user-selected first content partition identifier; rendering, at the mobile device, the first partitioned content segment of the plurality of partitioned content segments of the item of renderable content retrieved from the separate renderable content storage device using the user-selected first content partition identifier; and automatically retrieving, via the mobile device in response to completion of rendering of the first partitioned content segment of the plurality of partitioned content segments, a second partitioned content segment of the plurality of partitioned content segments of the item of renderable content identified using a second content partition identifier of the received plurality of content partition identifiers.

A system operative at a mobile device includes a memory; a display device; and a processor programmed to: control, via the mobile device, content partitioning at a separate renderable content storage device of an item of renderable content into a plurality of partitioned content segments that are each less in size than the entire item of renderable content and that each fit within available memory within the memory of the mobile device; render, on the display device of the mobile device as received from the separate renderable content storage device, a plurality of content partition identifiers that each identify one partitioned content segment of the plurality of partitioned content segments of the item of renderable content; retrieve, from the separate renderable content storage device, a first partitioned content segment of the plurality of partitioned content segments of the item of renderable content identified by a user-selected first content partition identifier; render, at the mobile device, the first partitioned content segment of the plurality of partitioned content segments of the item of renderable content retrieved from the separate renderable content storage device using the user-selected first content partition identifier; and automatically retrieve, via the mobile device in response to completion of rendering of the first partitioned content segment of the plurality of partitioned content segments, a second partitioned content segment of the plurality of partitioned content segments of the item of renderable content identified using a second content partition identifier of the received plurality of content partition identifiers.

A computer program product includes a non-transitory computer readable storage medium including a computer readable program code, where the computer readable program code when executed on a computer causes the computer to: control, via a mobile device, content partitioning at a separate renderable content storage device of an item of renderable content into a plurality of partitioned content segments that are each less in size than the entire item of renderable content and that each fit within available memory of the mobile device; render, on a display device of the mobile device as received from the separate renderable content storage device, a plurality of content partition identifiers that each identify one partitioned content segment of the plurality of partitioned content segments of the item of renderable content; retrieve, from the separate renderable content storage device, a first partitioned content segment of the plurality of partitioned content segments of the item of renderable content identified by a user-selected first content partition identifier; render, at the mobile device, the first partitioned content segment of the plurality of partitioned content segments of the item of renderable content retrieved from the separate renderable content storage device using the user-selected first content partition identifier; and automatically retrieve, via the mobile device in response to completion of rendering of the first partitioned content segment of the plurality of partitioned content segments, a second partitioned content segment of the plurality of partitioned content segments of the item of renderable content identified using a second content partition identifier of the received plurality of content partition identifiers.

DETAILED DESCRIPTION

Figure 1:
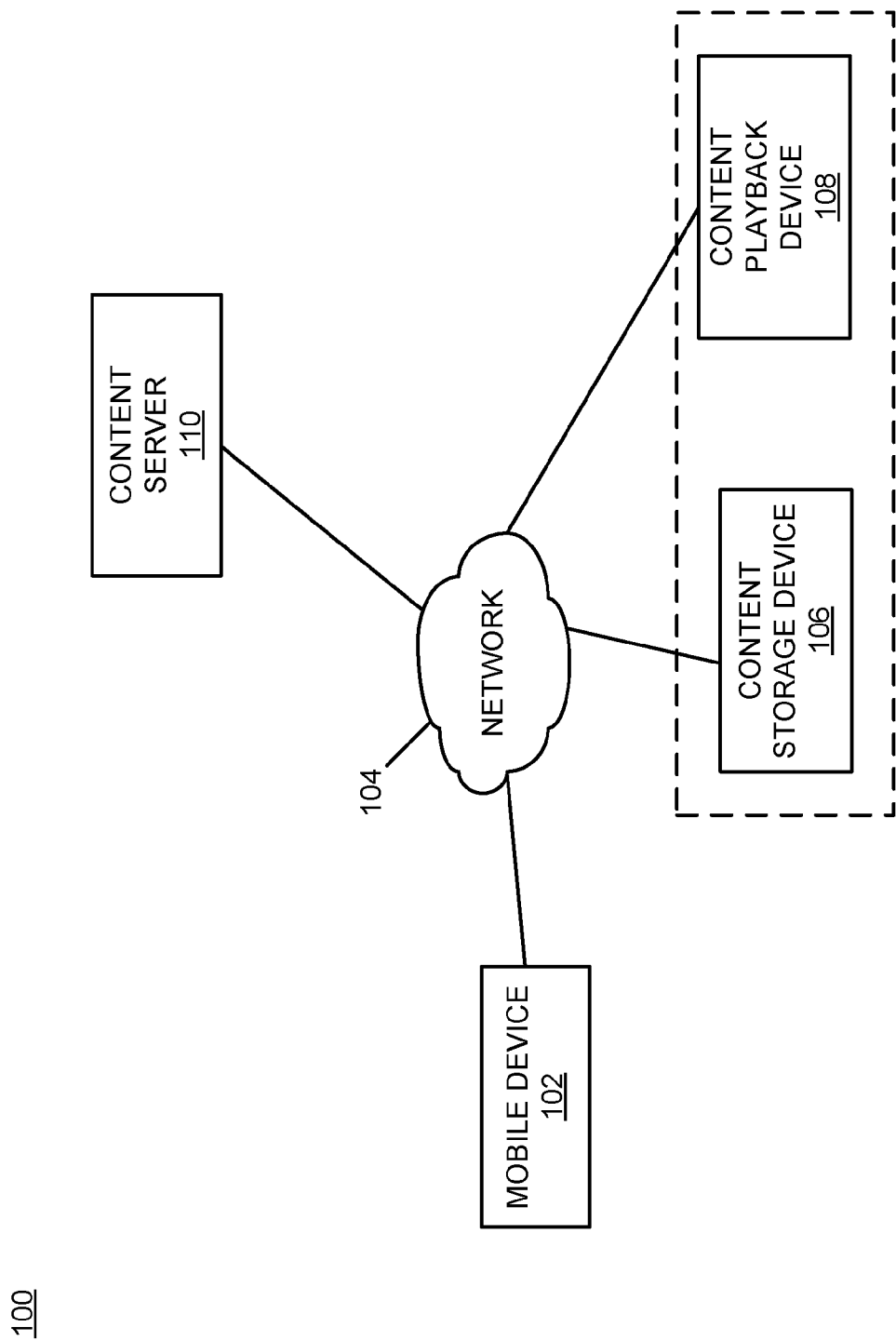
FIG. 1 is a block diagram of an example of an implementation of a system for renderable content partitioning and portability according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides renderable content partitioning and portability. Renderable content includes content, such as movies, television shows, and other content including video and/or audio components (hereinafter "content"). A mobile device, such as a cellular telephone, controls a content storage device, such as a server, a digital video recorder (DVR), or other storage device, to cause the content storage device to partition content based upon available storage at the mobile device and to send a portion of the partitioned content to the mobile device. The mobile device may render the received portion of the content. In response to detecting an input request to synchronize with the same or another content storage device, the mobile device initiates a synchronization process with the respective content storage device and causes the device to begin rendering the content at a point at which the content was paused on the mobile device. As such, the mobile device provides control capabilities for content partitioning and portability.

To initiate processing, the mobile device receives a request via an input device to acquire a segment of identified content from a content storage device. In response, the mobile device determines a storable duration for content based upon available memory for storage of content. The storable duration may be based upon storage requirements for available storage formats for the renderable content. There are many available storage formats for content and all are considered within the scope of the present subject matter. The mobile device requests a portion of the identified content based upon the determined storable duration from the content storage device using a content identifier for the content. The content storage device partitions the identified content into a segment (e.g., portion) of duration suitable for storage at the mobile device. The storage device sends the segment of content to the mobile device along with a content partition identifier associated with the segment. The mobile device stores the segment of content within the available memory and renders the segment of content via an output device associated with the mobile device.

It should be noted that the storage device may partition the content into multiple chapters, segments, or other groupings, based upon the received storable duration. Further, the mobile device may send the request for the portion of the content to the content storage device via any appropriate medium, such as infrared (IR) communication, radio frequency (RF) communication, or other approach.

The mobile device may render the content in response to receipt of a request via the input device to play the content. The mobile device may also time a duration of playback for the rendered content. In response to a request received via the input device to pause playback of the rendered content, the mobile device pauses playback and creates a playback pause identifier representative of the playback duration. The content may be resumed at a later time based upon the playback pause identifier.

Additionally, in response to a detecting a request via the input device to synchronize the playback of the content with a playback device, the mobile device sends the content identifier, the content partition identifier, and the playback pause identifier to the playback device. The playback device may include the original content storage device or may be another device. If the playback device is another device, it may retrieve the content from the content storage device or another storage device and resume playback of the content from the playback pause identifier in response to receipt of a request from the mobile device to resume playback of the content.

Alternatively, the mobile device may further determine a remaining portion of the stored segment of content based upon the duration of playback of the content. The mobile device may retrieve the remaining portion of the stored portion of the content from the memory and send the remaining portion of the content to the playback device. The playback device may resume playback of the content from the playback pause identifier in response to receipt of the remaining portion of the content and a request from the mobile device to resume playback of the content.

If the mobile device determines that playback of the content is completed, upon detecting a request to synchronize the playback of the content with the playback device, the mobile device may send the content identifier and the content partition identifier to the playback device with a request to resume playback at a location within the content subsequent to the received segment of the content. For example, where the content storage device partitioned the content into multiple chapters, segments, or other groupings, the content may be resumed at the beginning of the next chapter, segment, or grouping, as appropriate.

Where the content storage device creates multiple chapters, segments, or other groupings, the content storage device may send content partition identifiers for all segments created to the mobile device. As such, the mobile device may send a request for an identified segment of content to the content storage device using a selected content partition identifier in association with the content identifier. As such, upon completion of playback for a received portion of content, the mobile device may request the next segment (e.g., chapter) of content suitable for storage and playback at the mobile device.

As such, the present subject matter provides flexibility in content rendering for a user of a mobile device. Accordingly, many variations on processing of segments of content by the mobile device are possible. Further, the mobile device may synchronize playback of renderable content with multiple devices, such as a television or other devices accessible via a network. The mobile device may communicate with and control the other devices for partitioning, retrieval, playback, and synchronization of content playback.

The renderable content partitioning and portability described herein may be performed in real time to allow prompt partitioning, retrieval, playback, and synchronization of content between multiple devices. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for renderable content partitioning and portability. A mobile device 102 communicates via a network 104 with a content storage device 106, a content playback device 108, and a content server 110. The content storage device 106 and the content playback device 108 are illustrated enclosed within a dashed box to show that they may be the same device or may be multiple devices for any given implementation.

As will be described in more detail below in association with FIG. 2 through FIG. 5, the mobile device 102 provides automated control of renderable content partitioning and portability at the content storage device 106 and/or the content playback device 108. The respective content storage device responds to requests from the mobile device 102 for content partitioning. The automated control of renderable content partitioning and portability is based upon a storable duration of content at the mobile device 102, and may be based upon available memory associated with the mobile device 102. The automated control of renderable content partitioning and portability provides flexibility of viewing content by allowing the mobile device 102 to request partitioning and downloading of segments of content for rendering either via the mobile device 102 or via other devices. Partition identifiers and pause identifiers are used in conjunction with the content identifiers to allow content to be retrieved from additional sources, such as the content server 110 and to preserve partitioning information previously requested of the content storage device 106 and/or the content playback device 108.

It should be noted that the mobile device 102 may be a portable computing device, either by a user's ability to move the mobile device 102 to different locations, or by the mobile device 102's association with a portable platform, such as a plane, train, automobile, or other moving vehicle. It should also be noted that the mobile device 102 may be any computing device capable of processing information as described above and in more detail below. For example, the mobile device 102 may include devices such as a personal computer (e.g., desktop, laptop, palm, etc.) or a handheld device (e.g., cellular telephone, personal digital assistant (PDA), email device, music recording or playback device, etc.), or any other device capable of processing information as described in more detail below.

The network 104 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
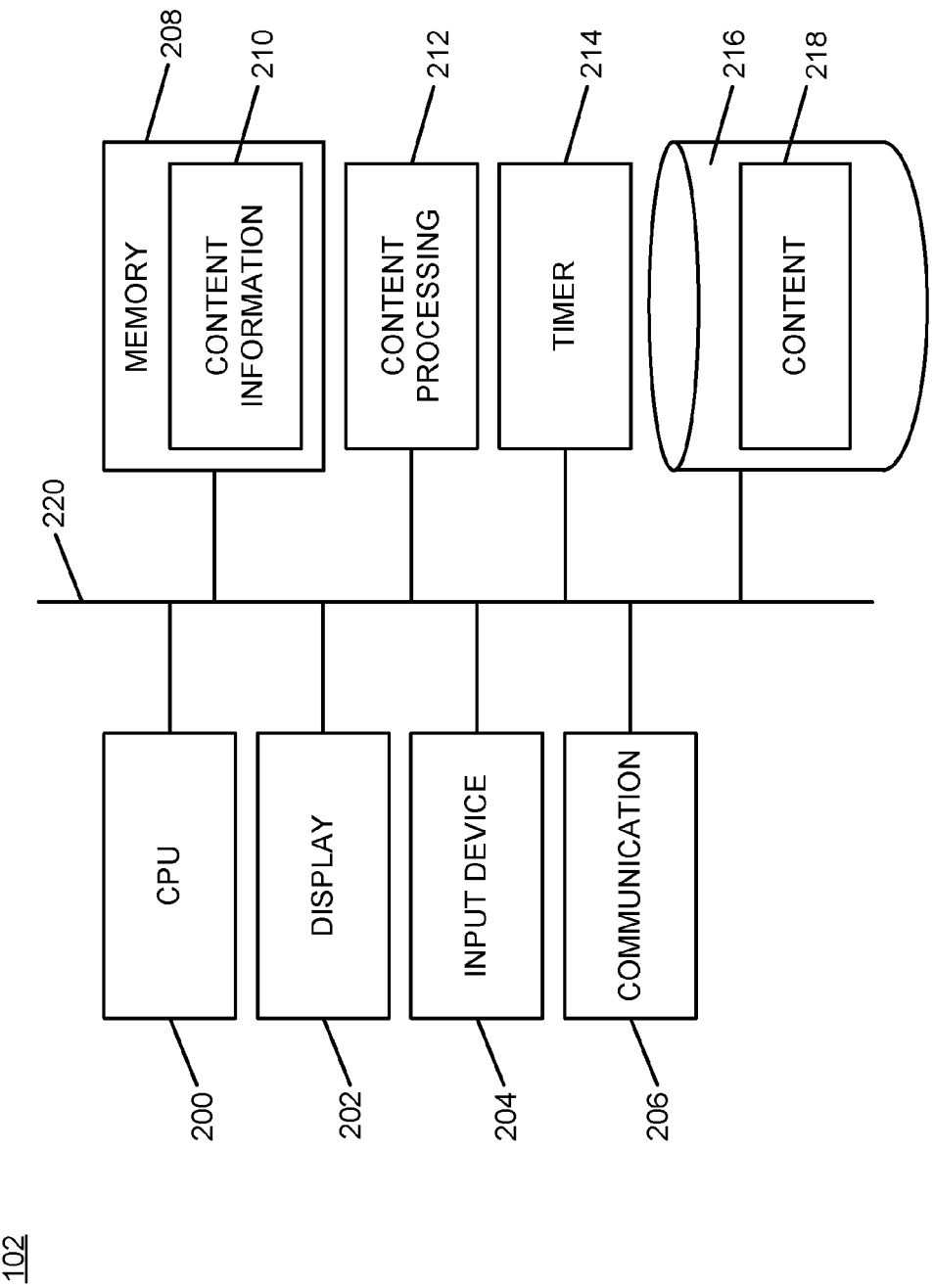
FIG. 2 is a block diagram of an example of an implementation of a mobile device that is capable of performing automated control of renderable content partitioning and portability for content storage devices according to an embodiment of the present subject matter.

FIG. 2 is a block diagram of an example of an implementation of the mobile device 102 that is capable of performing automated control of renderable content partitioning and portability for content storage devices. It should be noted that the block diagram of the mobile device 102 is also applicable to a content storage device, such as the content storage device 106, the content playback device 108, and the content server 110. As such, subject to distinctions in the actual processing performed by a content storage device, as described in more detail below, the description below of the mobile device 102 applies at least equally to a content storage device with respect to modules and architecture.

A central processing unit (CPU) 200 provides computer instruction execution, computation, and other capabilities within the mobile device 102. A display 202 provides visual information to a user of the mobile device 102 and an input device 204 provides input capabilities for the user.

The display 202 may include any display device, such as a cathode ray tube (CRT), liquid crystal display (LCD), light emitting diode (LED), projection, touchscreen, or other display element or panel. The input device 204 may include a computer keyboard, a keypad, a mouse, a pen, a joystick, or any other type of input device by which the user may interact with and respond to information on the display 202.

A communication module 206 provides interconnection capabilities that allow the mobile device 102 to communicate with other modules within the system 100, such as the content storage device 106, the content playback device 108, and the content server 110. The communication module 206 may include any electrical, protocol, and protocol conversion capabilities useable to provide the interconnection capabilities. The communication module 206 may also include infrared (IR) communication and/or radio frequency (RF) capabilities for communicating with other devices.

Though the communication module 206 is illustrated as a component-level module for ease of illustration and description purposes, it should be noted that the communication module 206 may include any hardware, programmed processor(s), and memory used to carry out the functions of the communication module 206 as described above and in more detail below. For example, the communication module 206 may include additional controller circuitry in the form of application specific integrated circuits (ASICs), processors, antennas, and/or discrete integrated circuits and components for performing communication and electrical control activities associated with the communication module 206. Additionally, the communication module 206 may include interrupt-level, stack-level, and application-level modules as appropriate. Furthermore, the communication module 206 may include any memory components used for storage, execution, and data processing for performing processing activities associated with the communication module 206. The communication module 206 may also form a portion of other circuitry described without departure from the scope of the present subject matter.

A memory 208 includes a content information storage area 210 that stores information, such as content identifiers, content partition identifiers, playback pause identifiers, and other information associated with the mobile device 102. As will be described in more detail below, information stored within the content information storage area 210 is used to provide the automated control of renderable content partitioning and portability of the mobile device 102.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

The mobile device 102 also includes a content processing module 212 and a timer module 214. The content processing module 212 implements the automated control of renderable content partitioning and portability of the mobile device 102. The timer module 214 provides timing capabilities for measuring and recording playback times, pause times, and other timing functions associated with the automated control of renderable content partitioning and portability of the mobile device 102.

Though the content processing module 212 and the timer module 214 are illustrated as component-level modules for ease of illustration and description purposes, it should be noted that the content processing module 212 and the timer module 214 may include any hardware, programmed processor(s), and memory used to carry out the respective functions of these modules as described above and in more detail below. For example, the content processing module 212 and the timer module 214 may include additional controller circuitry in the form of application specific integrated circuits (ASICs), processors, and/or discrete integrated circuits and components for performing communication and electrical control activities associated with the respective devices. Additionally, the content processing module 212 and the timer module 214 may also include interrupt-level, stack-level, and application-level modules as appropriate. Furthermore, the content processing module 212 and the timer module 214 may include any memory components used for storage, execution, and data processing for performing processing activities associated with the respective modules.

It should also be noted that the content processing module 212 and the timer module 214 may form a portion of other circuitry described without departure from the scope of the present subject matter. Further, the content processing module 212 and the timer module 214 may alternatively be implemented as applications stored within the memory 208. In such an implementation, the content processing module 212 and the timer module 214 may include instructions executed by the CPU 200 for performing the functionality described herein. The CPU 200 may execute these instructions to provide the processing capabilities described above and in more detail below for the mobile device 102. The content processing module 212 and the timer module 214 may form a portion of an interrupt service routine (ISR), a portion of an operating system, a portion of a browser application, or a portion of a separate application without departure from the scope of the present subject matter.

A database 216 is associated with the mobile device 102 and provides storage capabilities for information associated with the automated control of renderable content partitioning and portability of the mobile device 102. The database 216 includes a content storage area 218 that may be stored in the form of tables or other arrangements accessible by the mobile device 102. The content storage area 218 includes storage for content segments received from any of the content storage device 106, the content playback device 108, and the content server 110.

The CPU 200, the display 202, the input device 204, the communication module 206, the memory 208, the content processing module 212, the timer module 214, and the database 216 are interconnected via an interconnection 220. The interconnection 220 may include a system bus, a network, or any other interconnection capable of providing the respective components with suitable interconnection for the respective purpose.

While the mobile device 102 is illustrated with and has certain components described, other modules and components may be associated with the mobile device 102 without departure from the scope of the present subject matter. Additionally, it should be noted that, while the mobile device 102 is described as a single device for ease of illustration purposes, the components within the mobile device 102 may be co-located or distributed and interconnected via a network without departure from the scope of the present subject matter. For a distributed arrangement, the display 202 and the input device 204 may be located at a point of sale device, kiosk, or other location, while the CPU 200 and memory 208 may be located at a local or remote server. Many other possible arrangements for components of the mobile device 102 are possible and all are considered within the scope of the present subject matter. It should also be understood that, though the content storage area 218 is shown within the database 216, it may also be stored within the memory 208 without departure from the scope of the present subject matter. Accordingly, the mobile device 102 may take many forms and may be associated with many platforms.

Figure 3:
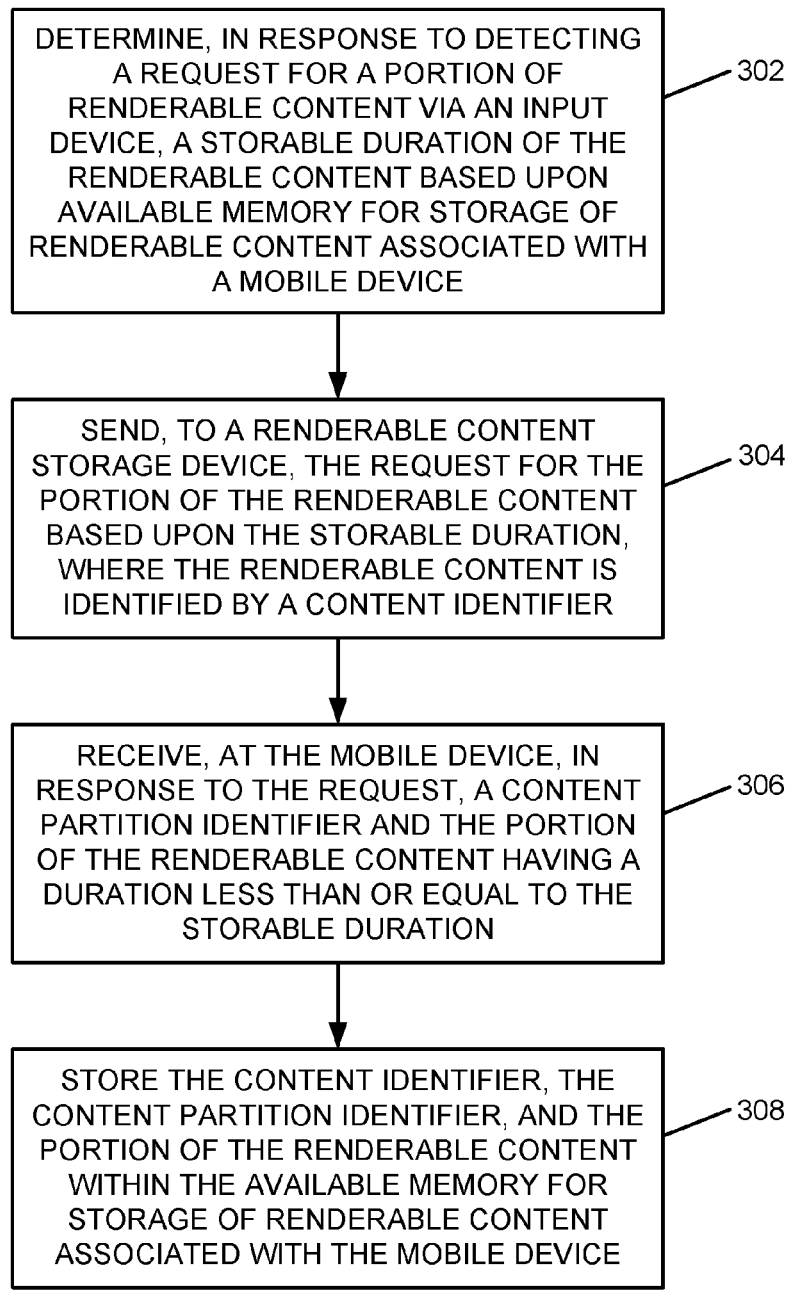
FIG. 3 is a flow chart of an example of an implementation of a process for automated control of renderable content partitioning and portability according to an embodiment of the present subject matter.
Figure 4:
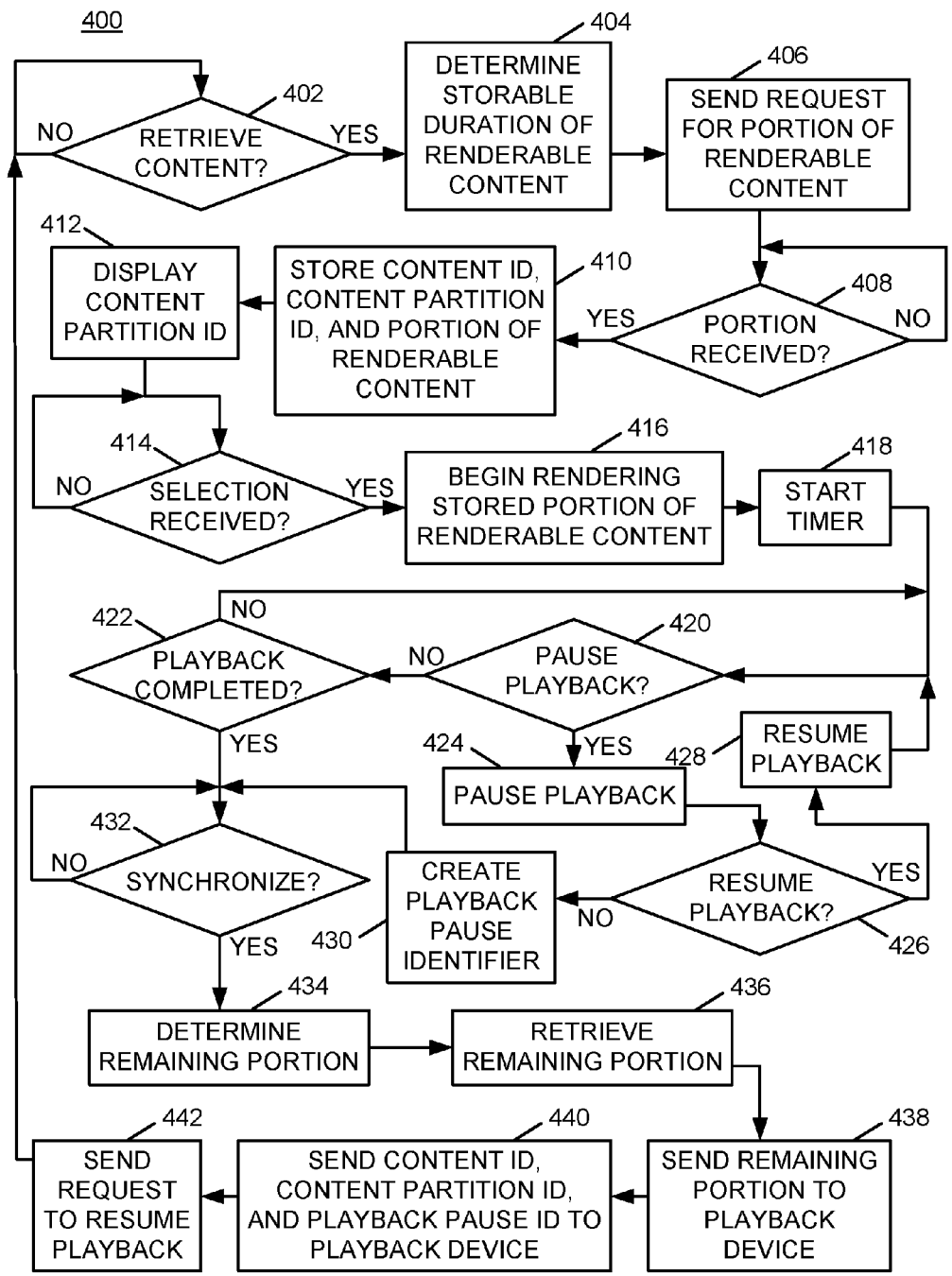
FIG. 4 is a flow chart of an example of an implementation of a process for automated control of renderable content partitioning and portability based upon storage capabilities of a mobile device according to an embodiment of the present subject matter.
Figure 5:
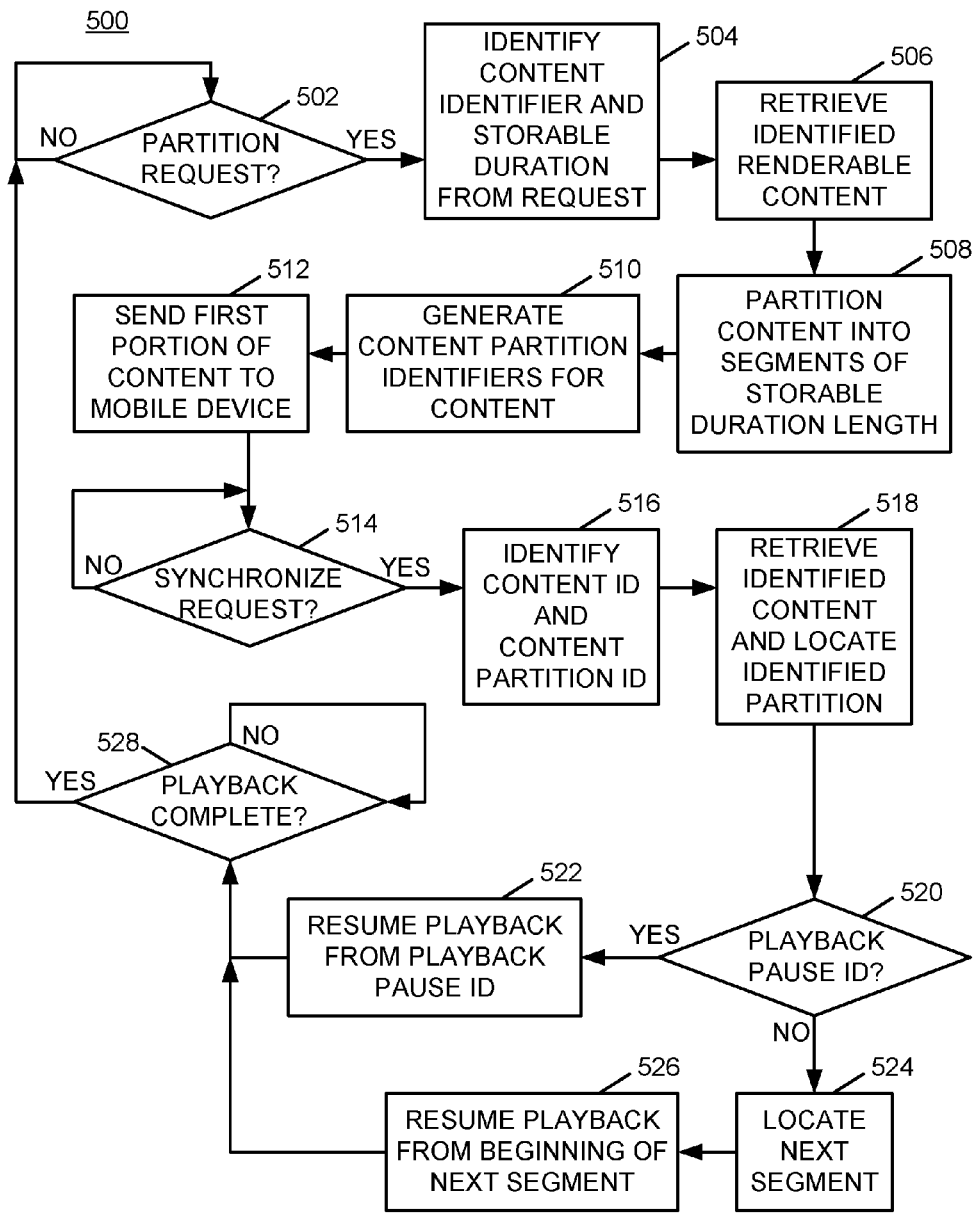
FIG. 5 is a flow chart of an example of an implementation of a process for automated renderable content partitioning

FIG. 3 through FIG. 5 below describe example processes that may be executed by devices, such as the mobile device 102, to perform the automated control of renderable content partitioning and portability associated with the present subject matter. Many other variations on the example processes are possible and all are considered within the scope of the present subject matter. The example processes may be performed by modules, such as the content processing module 212 and/or executed by the CPU 200, associated with such devices. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 for automated control of renderable content partitioning and portability. At block 302, the process 300 determines, in response to detecting a request for a portion of renderable content via an input device, a storable duration of the renderable content based upon available memory for storage of renderable content associated with a mobile device. At block 304, the process 300 sends, to a renderable content storage device, the request for the portion of the renderable content based upon the storable duration, where the renderable content is identified by a content identifier. At block 306, the process 300 receives, at the mobile device, in response to the request, a content partition identifier and the portion of the renderable content having a duration less than or equal to the storable duration. At block 308, the process 300 stores the content identifier, the content partition identifier, and the portion of the renderable content within the available memory for storage of renderable content associated with the mobile device.

FIG. 4 is a flow chart of an example of an implementation of a process 400 for automated control of renderable content partitioning and portability based upon storage capabilities of a mobile device, such as the mobile device 102. At decision point 402, the process 400 waits for detection of a request via an input device, such as the input device 204, to retrieve a segment of renderable content from a content storage device, such as the content storage device 106. The request may be detected, for example, via receipt of a selection associated with the input device 204 of the mobile device 102 in response to display of an option to retrieve a segment of content displayed via the display 202.

Upon detection of a request to retrieve a segment of renderable content, at block 404 the process 400 determines a storable duration of renderable content based upon available memory, such as within the memory 208 or the content storage area 218 of the database 216, for storage of renderable content associated with a mobile device 102. At block 406, the process 400 sends, to a renderable content storage device, such as the content storage device 106, a request for a portion of a selected item of renderable content based upon the storable duration. The request may alternatively be sent to a renderable content server, such as the content server 110, or other device. The request for the selected item of renderable content is identified by a content identifier. The content identifier may be an alphanumeric value, such as a name of a movie, or other identifier as appropriate for the given implementation.

At decision 408, the process 400 waits to receive, in response to the request, a content partition identifier and a portion of the renderable content having a duration less than or equal to the storable duration at the mobile device 102. The mobile device 102 may receive the portion of the renderable content from a content storage device, such as the content storage device 106, or from a renderable content server, such as the content server 110 or other device, in response to sending the request for the portion of renderable content to the respective device.

At block 410, the process 400 stores the content identifier, the content partition identifier, and the portion of the renderable content within the available memory for storage of renderable content associated with the mobile device 102. At block 412, the process 400 displays the content partition identifier via a display device, such as the display 202, associated with the mobile device 102.

At decision point 412, the process 400 makes a determination as to whether a selection of the content partition identifier has been detected and received via the input device 204 associated with the mobile device 102. When a determination is made that a selection of the content partition identifier has been detected and received via the input device 204, the process 400 begins rendering the stored portion of the renderable content on the display 202 in response to the selection of the content partition identifier at block 416. At block 418, the process 400 starts a timer, such as the timer module 214, to continuously time a duration of playback for the stored portion of the renderable content.

It should be understood that, though the timer module 214 is described in association with the present example of use in determining a duration of playback, possibilities other than time-based measurement exist for monitoring a duration of playback for renderable content. For example, a remaining size of the stored portion of the renderable content may alternatively be measured, and the remaining size may be determined based upon a storage format for the content. In such an implementation, playback pause identifiers may be created based upon stored content size/format and determinations for a remaining portion of content after a pause has been detected may be based upon size/format of the stored renderable content that has not been rendered at a time of such a determination. Other possibilities exist for creation of playback pause identifiers and for determining a duration of playback for renderable content, and all are considered within the scope of the present subject matter.

At decision point 420, the process 400 makes a determination as to whether a request to pause playback of the renderable content has been detected via the input device 204. When a determination is made that a request to pause playback of the renderable content has not been detected via the input device 204, the process 400 makes a determination as to whether playback of the renderable content has been completed at decision point 422. When a determination is made that playback of the renderable content has not been completed, the process 400 returns to decision point 420 and iterates as described above.

When a determination is made at decision point 420 that a request to pause playback of the renderable content is detected via the input device 204, the process 400 pauses playback of the renderable content at block 424. The process 400 makes a determination at decision point 426 as to whether a request to resume playback of the renderable content has been detected via the input device 204. It is understood that the process 400 may wait for a configured period of time at decision point 426 to make this determination and that this processing is not shown within FIG. 4 for ease of illustration purposes.

When a determination is made at decision point 426 that a request to resume playback of the renderable content has been detected via the input device 204, the process 400 resumes playback of the renderable content at block 428 and returns to decision point 420 to iterate as described above. When a determination is made at decision point 426 that a request to resume playback of the renderable content has not been detected via the input device 204, the process 400 creates a playback pause identifier based upon the duration of playback of the renderable content at block 430.

Returning to the description of decision point 422, when a determination is made that playback of the renderable content has completed, or upon creation of the playback pause identifier at block 430, the process 400 waits at decision point 432 for a request to be detected via the input device 204 to synchronize the playback of the renderable content with a content storage device, such as the content storage device 106 or the content playback device 108.

When a determination is made at decision point 432 that a request to synchronize the playback of the renderable content with a content storage device has not been detected via the input device 204, the process awaits another request to synchronize and iterates at decision point 432. When a determination is made that a request to synchronize the playback of the renderable content with a content playback device has been detected via the input device 204, the process 400 determines a remaining portion of the stored portion of the renderable content based upon the duration of playback of the renderable content at block 434.

The process 400 may alternatively determine that playback of the renderable content is completed based upon the duration of playback for the renderable content at block 434. In such a situation, the process 400 may alternatively return to block 406 to request a new portion of content from the respective content storage device or may bypass block 436 and block 438, described below. These additional processing segments are not shown within the process 400 for ease of illustration purposes.

At block 436, the process 400 retrieves any remaining portion of the stored portion of the renderable content from memory, such as the memory 208 or the database 216. At block 438, if there is any remaining portion of the renderable content that has not been rendered, the process 400 sends the remaining portion of the stored portion of the renderable content to the content playback device. At block 440, the process 400 sends the content identifier, the content partition identifier, and the playback pause identifier to the content playback device. At block 442, the process 400 sends a request to the content playback device to resume playback of the renderable content at the content playback device beginning from the playback pause identifier. It is noted that the playback pause identifier may also indicate a position within the renderable content representing that playback of the stored portion of the renderable content has been completed. This additional processing is not shown within FIG. 4 for ease of illustration purposes. As such, processing at block 442 may include sending a request to resume playback at a location within the renderable content subsequent to the received portion of the renderable content. The process 400 returns to decision point 402 to await detection of a new request to retrieve an item of renderable content.

As such, the process 400 provides for request and retrieval of portions of renderable content from content storage devices based upon available storage at a mobile device, provides playback and pause capabilities for the retrieved portions of renderable content, and provides synchronization capabilities to resume playback of the content at a content rendering device. Many other variations on the processing described are possible and all are considered within the scope of the present subject matter.

It is understood that complementary processing may be performed at a content storage and/or content rendering device to interact with the process 400 described above. Such processing includes receiving requests to partition renderable content into chapters or segments. The partitioned content may be sent to a mobile device for storage and playback. The content storage and/or content rendering device may also receive a request to synchronize playback of the renderable content from a point at which playback has been paused or completed via the mobile device. The respective device may receive a remainder of the renderable content from the mobile device and resume playback of the remainder or may resume playback from a location subsequent to the portion (e.g., segment or chapter) that was sent to the mobile device. Many other variations on the processing associated with a content storage and/or content rendering device are possible and all are considered within the scope of the present subject matter. FIG. 5 described below represents one such example complementary process.

FIG. 5 is a flow chart of an example of an implementation of a process 500 for automated renderable content partitioning and portability at a content storage device, such as the content storage device 106, the content playback device 108, or the content server 110. At decision point 502, the process 500 waits for detection of a request for a portion of a selected item (e.g., segment) of renderable content based upon the storable duration associated with a mobile device, such as the mobile device 102. The request for the selected item of renderable content is identified by a content identifier. As discussed above in FIG. 4, the content identifier may be an alphanumeric value, such as a name of a movie, or other identifier as appropriate for the given implementation. The request may be detected, for example, via receipt of a selection associated with the input device 204 of the mobile device 102, or via other communication appropriate for the given implementation.

Upon detection of the request for a segment of renderable content, at block 504 the process 500 identifies the content identifier (ID) and storable duration associated with the request. At block 506, the process 500 retrieves the identified renderable content from either local or remote storage (not shown). At block 508, the process 500 partitions the renderable content into segments (e.g., chapters) based upon the storable duration associated with the mobile device 102. At block 510, the process 500 generates content partition identifiers (IDs) for each partitioned segment. At block 512, the process 500 sends the content partition identifiers and a first portion of the renderable content having a duration less than or equal to the storable duration to the mobile device 102.

At decision point 514, the process 500 waits to detect a request, for example, via the input device 204 associated with the mobile device 102, to synchronize playback of the renderable content. Upon detection of a request to synchronize playback of the renderable content with the mobile device 102, the process 500 identifies the content ID and the content partition ID from the request at block 516. At block 518, the process 500 retrieves the identified content and locates the identified partition.

At decision point 520, the process 500 determines whether the playback synchronization request from the mobile device 102 includes a playback pause identifier (ID). When a determination is made that the playback synchronization request includes a playback pause ID, the process 500 resumes playback of the renderable content from a location within the renderable content represented by the playback pause ID at block 522. When a determination is made at decision point 520 that a playback pause ID is not associated with playback synchronization request from the mobile device 102, the process 500 locates the next segment of renderable content at block 524. At block 526, the process 500 resumes playback from the beginning of the next segment of renderable content.

Upon resuming playback of the renderable content based upon a playback pause ID at block 522 or upon resuming playback from the beginning of the next segment of renderable content at block 526, the process 500 makes a determination at decision point 528 as to whether playback is complete, such as via detection of a playback pause or stop request via the input device 204, or upon completion of playback of the renderable content. Playback of the renderable content may continue until a determination is made that playback is completed. Upon making the determination that playback is completed, the process 500 returns to decision point 502 to await another detection of a request for a portion of a selected item of renderable content.

As described above in association with FIG. 1 through FIG. 5, the example systems and processes provide automated control of renderable content partitioning and portability via a mobile device. Many other variations and additional activities associated with automated control of renderable content partitioning and portability are possible and all are considered within the scope of the present subject matter.

Those skilled in the art will recognize, upon consideration of the above teachings, that certain of the above examples are based upon use of a programmed processor, such as the CPU 200. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
controlling, via a mobile device, content partitioning at a separate renderable content storage device of an item of renderable content into a plurality of partitioned content segments that are each less in size than the entire item of renderable content and that each fit within available memory of the mobile device;
rendering, on a display device of the mobile device as received from the separate renderable content storage device, a plurality of content partition identifiers that each identify one partitioned content segment of the plurality of partitioned content segments of the item of renderable content;
retrieving, from the separate renderable content storage device, a first partitioned content segment of the plurality of partitioned content segments of the item of renderable content identified by a user-selected first content partition identifier;
rendering, at the mobile device, the first partitioned content segment of the plurality of partitioned content segments of the item of renderable content retrieved from the separate renderable content storage device using the user-selected first content partition identifier; and
automatically retrieving, via the mobile device in response to completion of rendering of the first partitioned content segment of the plurality of partitioned content segments, a second partitioned content segment of the plurality of partitioned content segments of the item of renderable content identified using a second content partition identifier of the received plurality of content partition identifiers.

2. The method of claim 1, further comprising:
rendering, in association with the automated retrieval of the second partitioned content segment, the second partitioned content segment of the plurality of partitioned content segments of the item of renderable content at the mobile device.

3. The method of claim 2, further comprising:
detecting, via an input device of the mobile device, both a request to pause playback of the second partitioned content segment of the plurality of partitioned content segments of the item of renderable content at the mobile device and a request to synchronize the playback of the second partitioned content segment of the plurality of partitioned content segments of the item of renderable content with a content playback device.

4. The method of claim 3, further comprising:
sending each of an identifier that identifies the item of renderable content, the second content partition identifier of the received plurality of content partition identifiers that identifies the second partitioned content segment of the plurality of partitioned content segments of the item of renderable content that was paused, and a playback pause identifier that specifies a duration of playback of the second partitioned content segment of the plurality of partitioned content segments of the item of renderable content to the content playback device; and
controlling, via the mobile device, the content playback device to begin rendering the second partitioned content segment of the plurality of partitioned content segments of the item of renderable content at a point at which the second partitioned content segment of the plurality of partitioned content segments of the item of renderable content was paused on the mobile device.

5. The method of claim 3, further comprising:
retrieving, from a memory of the mobile device, a remainder of the second partitioned content segment comprising any content after a location within the second partitioned content segment at which the request to pause the playback was detected;
sending the remainder of the second partitioned content segment to the content playback device; and
controlling, via the mobile device, the content playback device to begin rendering the remainder of the second partitioned content segment.

6. The method of claim 2, further comprising:
detecting a request, via an input device of the mobile device, to synchronize playback of the item of renderable content with a content playback device;
determining that playback of the second partitioned content segment of the plurality of partitioned content segments of the item of renderable content is completed based upon a duration of playback for the second partitioned content segment of the plurality of partitioned content segments of the item of renderable content; and
controlling, via the mobile device using a third content partition identifier of the received plurality of content partition identifiers, the content playback device to begin rendering a third partitioned content segment of the plurality of partitioned content segments of the item of renderable content.

7. The method of claim 1, where retrieving, from the separate renderable content storage device, the first partitioned content segment of the plurality of partitioned content segments of the item of renderable content identified by the user-selected first content partition identifier comprises:
retrieving the first partitioned content segment of the plurality of partitioned content segments of the item of renderable content from the separate renderable content storage device using each of a content identifier of the item of renderable content and the first content partition identifier.

8. A system operative at a mobile device, comprising:
a memory;
a display device; and
a processor programmed to:
control, via the mobile device, content partitioning at a separate renderable content storage device of an item of renderable content into a plurality of partitioned content segments that are each less in size than the entire item of renderable content and that each fit within available memory within the memory of the mobile device;

render, on the display device of the mobile device as received from the separate renderable content storage device, a plurality of content partition identifiers that each identify one partitioned content segment of the plurality of partitioned content segments of the item of renderable content;

retrieve, from the separate renderable content storage device, a first partitioned content segment of the plurality of partitioned content segments of the item of renderable content identified by a user-selected first content partition identifier;

render, at the mobile device the first partitioned content segment of the plurality of partitioned content segments of the item of renderable content retrieved from the separate renderable content storage device using the user-selected first content partition identifier; and automatically retrieve, via the mobile device in response to completion of rendering of the first partitioned content segment of the plurality of partitioned content segments, a second partitioned content segment of the plurality of partitioned content segments of the item of renderable content identified using a second content partition identifier of the received plurality of content partition identifiers.

9. The system of claim 8, where the processor is further programmed to:
render, in association with the automated retrieval of the second partitioned content segment, the second partitioned content segment of the plurality of partitioned content segments of the item of renderable content at the mobile device.

10. The system of claim 9, further comprising:
an input device; and
where the processor is further programmed to:
detect, via the input device, both a request to pause playback of the second partitioned content segment of the plurality of partitioned content segments of the item of renderable content at the mobile device and a request to synchronize the playback of the second partitioned content segment of the plurality of partitioned content segments of the item of renderable content with a content playback device.

11. The system of claim 10, where the processor is further programmed to:
send each of an identifier that identifies the item of renderable content, the second content partition identifier of the received plurality of content partition identifiers that identifies the second partitioned content segment of the plurality of partitioned content segments of the item of renderable content that was paused, and a playback pause identifier that specifies a duration of playback of the second partitioned content segment of the plurality of partitioned content segments of the item of renderable content to the content playback device; and
control, via the mobile device, the content playback device to begin rendering the second partitioned content segment of the plurality of partitioned content segments of the item of renderable content at a point at which the second partitioned content segment of the plurality of partitioned content segments of the item of renderable content was paused on the mobile device.

12. The system of claim 10, where the processor is further programmed to:
retrieve, from the memory of the mobile device, a remainder of the second partitioned content segment comprising any content after a location within the second partitioned content segment at which the request to pause the playback was detected;
send the remainder of the second partitioned content segment to the content playback device; and
control, via the mobile device, the content playback device to begin rendering the remainder of the second partitioned content segment.

13. The system of claim 9, further comprising:
an input device; and
where the processor is further programmed to:
detect a request, via the input device of the mobile device, to synchronize playback of the item of renderable content with a content playback device;
determine that playback of the second partitioned content segment of the plurality of partitioned content segments of the item of renderable content is completed based upon a duration of playback for the second partitioned content segment of the plurality of partitioned content segments of the item of renderable content; and
control, via the mobile device using a third content partition identifier of the received plurality of content partition identifiers, the content playback device to begin rendering a third partitioned content segment of the plurality of partitioned content segments of the item of renderable content.

14. A computer program product comprising a non-transitory computer readable storage medium including a computer readable program code, where the computer readable program code when executed on a computer causes the computer to:
control, via a mobile device, content partitioning at a separate renderable content storage device of an item of renderable content into a plurality of partitioned content segments that are each less in size than the entire item of renderable content and that each fit within available memory of the mobile device;
render, on a display device of the mobile device as received from the separate renderable content storage device, a plurality of content partition identifiers that each identify one partitioned content segment of the plurality of partitioned content segments of the item of renderable content;
retrieve, from the separate renderable content storage device, a first partitioned content segment of the plurality of partitioned content segments of the item of renderable content identified by a user-selected first content partition identifier;
render, at the mobile device, the first partitioned content segment of the plurality of partitioned content segments of the item of renderable content retrieved from the separate renderable content storage device using the user-selected first content partition identifier; and
automatically retrieve, via the mobile device in response to completion of rendering of the first partitioned content segment of the plurality of partitioned content segments, a second partitioned content segment of the plurality of partitioned content segments of the item of renderable content identified using a second content partition identifier of the received plurality of content partition identifiers.

15. The computer program product of claim 14, where the computer readable program code when executed on the computer further causes the computer to:
  render, in association with the automated retrieval of the second partitioned content segment, the second partitioned content segment of the plurality of partitioned content segments of the item of renderable content at the mobile device.

16. The computer program product of claim 15, where the computer readable program code when executed on the computer further causes the computer to:
  detect, via an input device of the mobile device, both a request to pause playback of the second partitioned content segment of the plurality of partitioned content segments of the item of renderable content at the mobile device and a request to synchronize the playback of the second partitioned content segment of the plurality of partitioned content segments of the item of renderable content with a content playback device.

17. The computer program product of claim 16, where the computer readable program code when executed on the computer further causes the computer to:
  send each of an identifier that identifies the item of renderable content, the second content partition identifier of the received plurality of content partition identifiers that identifies the second partitioned content segment of the plurality of partitioned content segments of the item of renderable content that was paused, and a playback pause identifier that specifies a duration of playback of the second partitioned content segment of the plurality of partitioned content segments of the item of renderable content to the content playback device; and
  control, via the mobile device, the content playback device to begin rendering the second partitioned content segment of the plurality of partitioned content segments of the item of renderable content at a point at which the second partitioned content segment of the plurality of partitioned content segments of the item of renderable content was paused on the mobile device.

18. The computer program product of claim 16, where the computer readable program code when executed on the computer further causes the computer to:
  retrieve, from a memory of the mobile device, a remainder of the second partitioned content segment comprising any content after a location within the second partitioned content segment at which the request to pause the playback was detected;
  send the remainder of the second partitioned content segment to the content playback device; and
  control, via the mobile device, the content playback device to begin rendering the remainder of the second partitioned content segment.

19. The computer program product of claim 15, where the computer readable program code when executed on the computer further causes the computer to:
  detect a request, via an input device of the mobile device, to synchronize playback of the item of renderable content with a content playback device;
  determine that playback of the second partitioned content segment of the plurality of partitioned content segments of the item of renderable content is completed based upon a duration of playback for the second partitioned content segment of the plurality of partitioned content segments of the item of renderable content; and
  control, via the mobile device using a third content partition identifier of the received plurality of content partition identifiers, the content playback device to begin rendering a third partitioned content segment of the plurality of partitioned content segments of the item of renderable content.

20. The computer program product of claim 14, where in causing the computer to retrieve, from the separate renderable content storage device, the first partitioned content segment of the plurality of partitioned content segments of the item of renderable content identified by the user-selected first content partition identifier, the computer readable program code when executed on the computer causes the computer to:
  retrieve the first partitioned content segment of the plurality of partitioned content segments of the item of renderable content from the separate renderable content storage device using each of a content identifier of the item of renderable content and the first content partition identifier.

* * * * *